United States Patent [19]

Horowitz et al.

[11] 4,163,706

[45] Aug. 7, 1979

[54] $Bi_2[M_{2-x}Bi_x]O_{7-y}$ COMPOUNDS WHEREIN M IS RU, IR OR MIXTURES THEREOF, AND ELECTROCHEMICAL DEVICES CONTAINING SAME (BAT-24)

[75] Inventors: Harold S. Horowitz, Clark; John M. Longo, New Providence; Joseph T. Lewandowski, Middlesex, all of N.J.

[73] Assignee: Exxon Research & Engineering Co., Florham Park, N.J.

[21] Appl. No.: 856,628

[22] Filed: Dec. 2, 1977

[51] Int. Cl.$^2$ .................. C25B 9/00; C25B 11/04; C01G 29/00; H01B 1/08
[52] U.S. Cl. .................. 204/242; 204/291; 252/518; 423/593; 429/27; 429/40
[58] Field of Search .............. 204/291, 242; 423/593; 252/472, 218; 429/27, 40

[56] References Cited

U.S. PATENT DOCUMENTS

| | | | |
|---|---|---|---|
| 3,553,109 | 1/1971 | Hoffman | 423/593 |
| 3,560,144 | 2/1971 | Sleight | 423/593 |
| 3,691,052 | 9/1972 | Langley | 204/291 X |
| 3,847,829 | 11/1974 | Bouchard | 423/593 X |
| 3,849,282 | 11/1974 | Degueldre et al. | 204/291 X |

OTHER PUBLICATIONS

Bouchard and Gillson, *Mat. Res. Bull.*, vol. 6, pp. 669–680, (1971).

*Primary Examiner*—John H. Mack
*Assistant Examiner*—D. R. Valentine
*Attorney, Agent, or Firm*—Kenneth P. Glynn

[57] ABSTRACT

Novel bismuth-rich pyrochlore-type compounds are described having the formula:

$$Bi_2[M_{2-x}Bi_x]O_{7-y}$$

wherein M is selected from the group consisting of Ru, Ir and mixtures thereof and wherein x is greater than zero and less than or equal to about 1.0 and y is greater than or equal to zero and less than or equal to about 1.0. Electrochemical devices containing these compounds as electrocatalyst materials for oxygen electrodes are also described.

34 Claims, 1 Drawing Figure

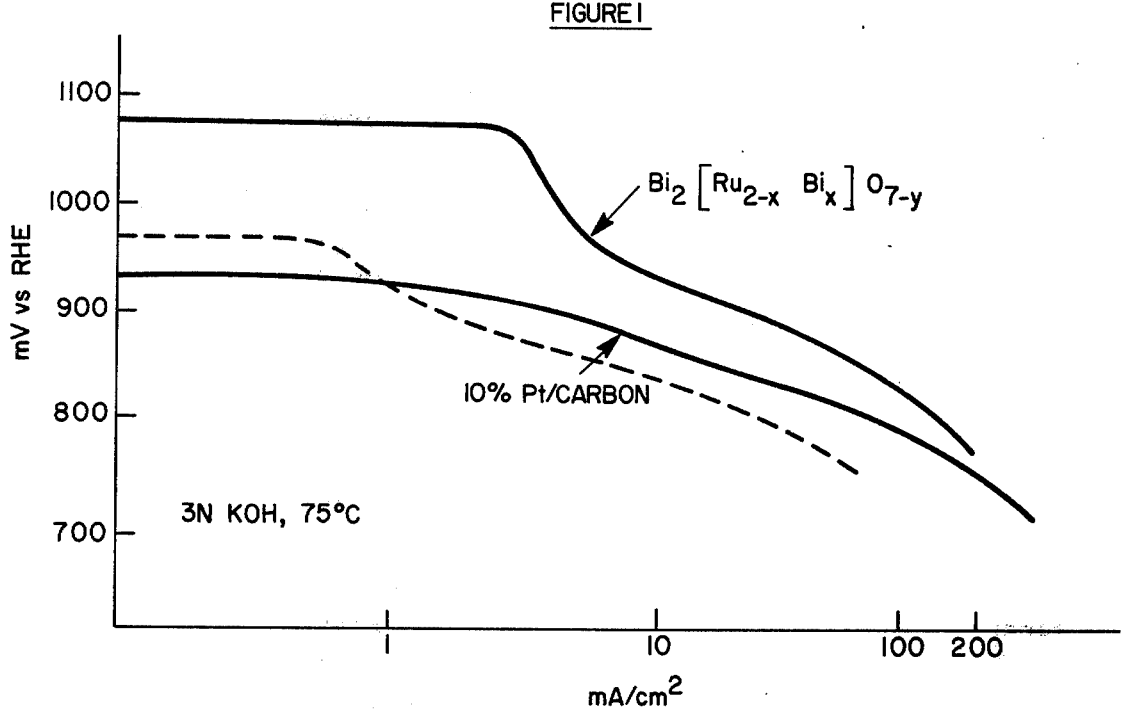
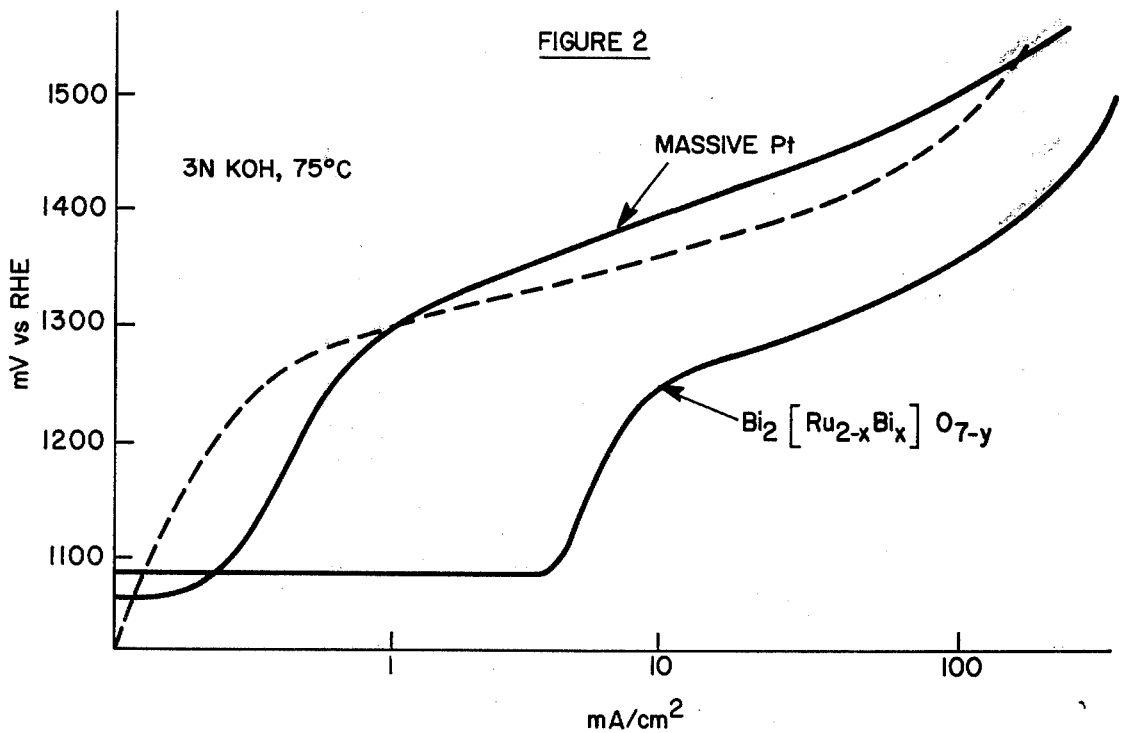

$Bi_2[M_{2-x}Bi_x]O_{7-y}$ COMPOUNDS WHEREIN M IS RU, IR OR MIXTURES THEREOF, AND ELECTROCHEMICAL DEVICES CONTAINING SAME (BAT-24)

BACKGROUND OF THE INVENTION AND STATEMENT OF PRIOR ART

The present invention is directed to novel bismuth-rich pyrochlore-type compounds having the formula:

$$Bi_2[M_{2-x}Bi_x]O_{7-y}$$

wherein M is selected from Ru, Ir and mixtures thereof, $0 < x \leq 1.0$ and $0 \leq y \leq 1.0$. The present invention is also directed to electrochemical devices containing these compounds as electrocatalyst materials for oxygen electrodes.

A number of various types of electrochemical devices have been developed over the past few years for the production of electrical energy by electrochemical reaction and obversely for the consumption of electrical energy to effectuate electrochemical reactions. Many of these devices rely upon a reaction involving oxygen (or air) as part of the mechanism to accomplish the desired result. For example, such devices may contain oxygen electrodes which are oxygen reducing cathodes in which oxygen is catalytically electroreduced. Alternatively, such devices may contain oxygen electrodes which catalyze the evolution of oxygen from water. In general, these electrodes are known in the art as oxygen electrodes. Thus, metal-oxygen batteries, metal/airbatteries, fuel cells, electrolyzers, metal electrowinning devices, etc., are among the well-known electrochemical devices which may contain oxygen electrodes. Typically, such devices contain electrocatalyst materials at one or more of their electrodes and precious metals, such as platinum (on carbon support) and silver (on carbon and other supports), are frequently employed as electrocatalysts.

In addition, various electrocatalytic alloys, compounds and compound mixtures have been developed for these electrochemical devices to achieve more desirable systems. For example, U.S. Pat. No. 3,536,533 (Kitamura) describes the use of an alloy of gold, silver, palladium and at least one of platinum, rhodium and ruthenium as a fuel cell electrode electrocatalyst, and U.S. Pat. No. 3,305,402 (Jones et al.) describes the use of a combination of platinum and ruthenium oxides as an electrocatalyst. However, both references describe these catalysts as fuel cell anode (or fuel oxidation) catalysts. O'Grady et al, Technical Report No. 37, "Ruthenium Oxide Catalysts for the Oxygen Electrode", Contract No. NOO14-67-A-0404-0006 (AD-779-899) Office of Naval Research, May 1974 (National Technical Information Service) describes the use of ruthenium oxide as an electrochemical catalyst for both the generation of oxygen and the reduction of oxygen. U.S. Pat. No. 3,405,010 (Kordesch et al.) teaches that spinel type electrode catalysts have been found to produce better activation of the electrode and improved electrolyte repellency of the electrode by the inclusion of ruthenium.

The foregoing prior art describes various types of electrodes including those which utilize iridium and/or ruthenium-containing catalysts. However, none of these references teaches or renders obvious the novel compounds of the present invention or the electrochemical devices of the present invention having these specified pyrochlore type compounds as the electrocatalysts.

Heretofore, many pyrochlore compounds such as the pyrochlore compounds $Pb_2Ru_2O_{7-y}$ (lattice parameter of 10.253 A), $Pb_2Ir_2O_{7-y}$ (lattice parameter of 10.271 A), $Bi_2Ir_2O_{7-y}$, $Bi_2Rh_2O_{7-y}$, $Pb_2Rh_2O_{7-y}$, $Pb_2Pt_2O_{7-y}$ and $Cd_2Re_2O_{7-y}$, commonly referred to as lead ruthenate, lead iridate, bismuth iridate, bismuth rhodate, lead rhodate, lead platinate and cadmium rhenate, respectively, have been known. For example, Longo, Raccah and Goodenough, Mat. Res. Bull., Vol. 4, pp. 191-202, (1969) have described the compounds $Pb_2Ru_2O_{7-y}$ and $Pb_2Ir_2O_{7-y}$ and their preparation at elevated temperatures which are in excess of 700° C. Sleight, Mat. Res. Bull., Vol. 6, p. 775 (1971) has also described the compounds $Pb_2Ru_2O_{7-y}$ and $Pb_2Ir_2O_{7-y}$ (including the pyrochlore compound $Pb_2Ru_2O_{6.5}$ having a lattice parameter of 10.271 A) and their preparation at 700° C. and 3000 atmospheres of pressure. U.S. Pat. No. 3,682,840 (Van Loan) describes the preparation of lead ruthenate at temperatures of 800° C. and higher. These references do not teach that bismuth-rich compounds of the present invention exist or that they may have superior physical properties. Further, they do not teach that these novel pyrochlore compounds may be useful as electrocatalysts in electrochemical devices such as in the present invention.

U.S. Pat. Nos. 3,769,382 (Kuo et al) and 3,951,672 (Langley et al) both disclose the preparation of lead ruthenate and lead iridate using various techniques at temperatures of at least about 600° C., and preferably at higher temperatures. However, these references fail to recognize that the bismuth-rich pyrochlores of the present invention are obtained at generally lower temperatures or that such pyrochlores have improved physical properties. Further, these references also fail to teach or render obvious the use of these novel pyrochlore compounds as electrocatalysts in electrochemical devices such as in the present invention.

Bouchard and Gillson, Mat. Res. Bull., Vol. 6, pp. 669-680 (1971) describe $Bi_2Ru_2O_7$ and $Bi_2Ir_2O_7$ preparation and properties, including the fact that these compounds have high conductivity and small Seebeck coefficients. However, there is no teaching that these compounds are useful electrocatalysts in electrochemical devices or that the bismuth-rich compounds of the present invention even exist. Derwent's Basic Abstract Journal, Section E. Chemdoc, Week No. Y25, Abstract No. 320 (Aug. 17, 1977), Derwent Accession No. 44866Y/25 describes electrodes for electrolysis of alkaline and carbonate solutions which comprise nickel-plated steel strips coated with high conductivity layers containing $Cd_2Re_2O_7$, $Pb_2Re_2O_{7-y}$ or $Ni_2Re_2O_7$. These compounds are prepared by impregnating perrhenic acid and a metal nitrate such as Cd nitrate onto a nickel strip and baking at 350° C. However, these compounds are all rhenates and are not ruthenates or iridates of the type claimed herein as novel compounds and in electrochemical devices. National Bureau of Standards, Wash., D.C. Inst. for Mat. Research, Abstract of Rept. No. NBSIR-75 742 (1975) describes the use of mixed oxides as oxygen reducing electrocatalysts in acid fuel cells, including the use of barium ruthenate. However, of all materials suggested for such electrocatalysts, none are of the pyrochlore type structure, much less of the bismuth-rich pyrochlore structure as in the present invention.

Trehoux, Abraham and Thomas, *Journal of Solid State Chemistry*, Vol. 21, pp. 203-209 (1977) ad *C. R. Acad. Sc. Paris*, t. 281 pp. 379-380 (1975) describe the solution preparation of a pyrochlore compound of the formula $K_{1.14}{}^{III}Bi_{0.27}[Bi_{0.27}{}^{III}Bi_{1.73}{}^{V}][O_{4.9}OH_{1.1}]OH_{0.8}$. The synthesis is carried out by adding a bismuth nitrate solution to a solution of 17% potassium hydroxide containing an excess of potassium hypochlorite. The reaction is carried out in this medium for 2 hours in a reflux type of apparatus at a temperature slightly higher than 100° C. The method of synthesis and the product prepared are different in many respects from the synthesis method and described products herein. The compound prepared in the cited reference is not an oxide but rather an oxy-hydroxide which has a significant amount of protons incorporated into the bulk structure. Proton nuclear magnetic resonance experiments on the materials of the present invention show that they are oxides which do not have significant amounts of protons incorporated into the structure. The pyrochlore synthesized by Trehoux et al is not a ruthenium or idirium-containing compound and, in fact, is believed not to be an electrically conductive pyrochlore. The potassium hydroxide solution used in the Trehoux reference serves not only as a reaction medium but also as a constituent in the reaction since potassium is incorporated into the A site of the pyrochlore. The compounds of the present invention are made by a method in which the alkali solution employed is solely a reaction medium with no measurable amount of alkali metal cations incorporated in the pyrochlore compound which results from the synthesis.

Morgenstern-Badarau and Michel, *Ann. Chim.*, Vol. 6, pp. 109 et seq. (especially at 109-113) (1971), and *C. R. Acad. Sc. Paris*, Vol. 271, Seire C. pp. 1313-1316 (1970) report the solution preparation of pyrochlore compounds having the formula $Pb_2Sn_2O_6 \cdot xH_2O$ where $0 < x < 1$. The conditions of preparation are strictly defined as follows: equimolar quantities of lead and tin are reacted from solution in the presence of the complexing agent nitrilo-triacetic acid (NITA) such that the concentration of $[NITA]/]Pb^{2+}]=2$. The pH of the reaction medium is fixed at 11 and the reaction is carried out for several hours at 80° C. The compound prepared by Morgenstern-Badarau et al. is a hydrated oxide, whereas pyrochlore bismuth compounds of the present invention are oxides. The pyrochlore prepared in this reference, while it does contain lead, is not a leadrich pyrochlore and is not similar to the materials of the present invention. In fact, the pyrochlore prepared by Morgenstern-Badarau and Michel is not a ruthenium or iridium-containing pyrochlore and is believed not to be electrically conductive. Morgenstern-Badarau et al also specifically state that their preparation method is one which gives a solid product containing $Pb^{2+}$. The compounds of the present invention, on the other hand, are such that they contain bismuth cations. While the presence of a complexing agent is required in the synthesis described in the cited reference, no such complexing agent is required in the method of preparation of the compounds of the present invention. Furthermore, the specified range of pH of the synthesis medium in the method of preparation of the compounds of the present invention clearly differs from the range of pH within which the method of the cited reference will operate. In fact, the Morgenstern-Badarau and Michel, *Ann. Chim.*, Vol. 6, pp. 109-124 (1971) reference clearly states that no solid product compound can be obtained if conditions which are coincident with those specified for the present invention (pH > 13.5, temperature = 80° C., zero concentration of complexing agent) are employed.

In summary, there exists a formidable body of prior art describing the existence of various pyrochlores, their potential uses including as dielectric materials, and describing various metals and metal oxides as electrocatalyst materials. Notwithstanding such prior art, there is no suggestion or teaching that (a) the bismuth-rich pyrochlore compounds of the present invention even exist, or that (b) these specific pyrochlores may be useful electrocatalyst materials in electrochemical devices as claimed in the present invention.

DESCRIPTION OF THE INVENTION

The present invention is directed to novel bismuthrich pyrochlore-type compounds having the formula:

$$Bi_2[M_{2-x}Bi_x]O_{7-y} \qquad (1)$$

wherein M is selected from the group consisting of Ru, Ir and mixtures thereof, and wherein x is greater than zero and less than or equal to about 1.0 and y is greater than or equal to zero and less than or equal to about 1.0.

The present invention is also directed to electrochemical devices containing these compounds as electrocatalytic materials for oxygen electrodes.

In one preferred embodiment of the present invention, the variable M is ruthenium and the compounds are represented by the formula:

$$Bi_2[Ru_{2-x}Bi_x]O_{7-y} \qquad (2)$$

wherein x and y are as described.

In another embodiment of the present invention, the variable M is iridium and the compounds are represented by the formula:

$$Bi_2[Ir_{2-x}Bi_x]O_{7-y} \qquad (3)$$

wherein x and y are as described.

In desired embodiments of the present invention, the variable x is within the range of about 0.1 to about 0.8, preferably about 0.25 to about 0.6. Also, the variable y is, as mentioned, within the range of about 0 to about 1.0. This variable represents an average value and takes into account the fact that a fraction of anion sites may be vacant in the crystal structure.

The compounds of the present invention, as represented by formulas (1), (2) and (3) above, display the pyrochlore crystal structure. Pyrochlore structure oxides are represented by the general formula $A_2B_2O_6O'$ wherein A and B are metal cations. A detailed description of their crystallographic structure may be found in *Structural Inorganic Chemistry*, Fourth Edition by A. F. Wells, Clarendon Press, Oxford, 1975. Briefly, oxides of this type display a face-centered cubic structure having a unit cell dimension of about 10Å. The B cations are octahedrally coordinated by oxygen anions (O). The structual framework is formed by a three-dimensional array of these corner shared octahedra, each sharing corners with six others. This framework has the composition $B_2O_6$. As Wells describes, this framework of octahedra is "based on the diamond net, having large holes which contain the O' and two A atoms, which themselves form a cuprite-like net $A_2O'$ interpenetrating the octahedral framework". The octahedra are actually arranged in tetrahedral clusters. These clusters of octahedra are then tetrahedrally arranged so as to form the large holes in the structure described by Wells. Each of these large holes may also be defined by four tetrahedrally arranged puckered, hexagonal rings which are formed by the corner shared octahedra. The A cations reside in the center of these puckered hexagonal rings and are coordinated by the six O anions which define the rings plus two more O' cations at a slightly different distance. These O' anions reside at the center of the large holes in the octahedral framework. It is the O' anions which may be partially or totally absent, leading to the general pyrochlore oxide formula $A_2B_2O_{7-y}$ where $0 \leq y \leq 1$. Thus, the compounds of the present invention are referred to as pyrochlore compounds, albeit they are not stoichiometric pyrochlores, but rather are bismuth-rich compounds of the formulas as above.

It has been discovered that the pyrochlore compounds of the present invention exhibit an expanded lattice, believed to be a result of the increased amount of bismuth in the crystal structure. Although merely a hypothesis at the present time, it is believed that there may exist a direct correlation between the extent of expansion of the lattice and the amount of excess bismuth relative to a bismuth to metal ratio of 1.0:1.0 in the crystalline structure. Thus, it is believed that all things otherwise being equal, the greater the lattice parameter, the greater the amount of bismuth and therefore the larger the variable x in the formula representing the compounds of the present invention. This hypothesis is supported by the fact that all compounds of the present invention, which have been prepared and lattice parameters determined, do indeed exhibit expanded lattices.

In certain pyrochlore structures, a slightly expanded lattice is obtainable by partial occupancy of the anion vacancies that may be present in the pyrochlore structure. For example, Sleight, *Mat. Res. Bull.*, Vol. 6, p. 775 (1971) prepared a slightly expanded $Pb_2Ru_2O_{7-y}$ lead ruthenate by carrying out the synthesis at 700° C. and 3000 atmospheres of pressure. This high pressure synthesis resulted in decreasing the magnitude of the variable y in the compound formula $Pb_2Ru_2O_{7-y}$ or, alternatively expressed, increased the fraction of O' anion sites which were occupied by oxygen ions. Thus, in the case of $Pb_2Ru_2O_{7-y}$, a slight lattice parameter increase was achieved by increasing the anion content of the lattice (by filling up vacant anion sites) while still maintaining a 1.0:1.0 lead to ruthenium ratio. In the case of $Bi_2Ru_2O_{7-y}$, the A cations are trivalent and preservation of electroneutrality therefore requires that all anion sites by occupied; thus, y in the formula $Bi_2Ru_2O_{7-y}$ must equal zero for the known stoichiometric compound (Bouchard and Gillson, *Mat. Res. Bull.*, Vol. 6, pp. 669–680, 1971). The only conceivable explanation for the expanded lattice exhibited by the compounds of the present invention is a bismuth-rich pyrochlore or, expressed differently, a substitute of ruthenium by trivalent or a combination of tri- and pentavalent bismuth ions. The substitution of these larger B ions (ionic radii of 1.02 and 0.72 Å for $Bi^{3+}$ and $Bi^{5+}$ respectively as compared to 0.62 Å for $Ru^{4+}$) will result in a significantly expanded lattice as is observed in the materials described in the present invention.

In general terms, the novel compounds of the present invention are prepared by a method which involves reacting bismuth and M cations to yield a pyrochlore oxide by precipitation of bismuth and M cations from an aqueous solution source of these cations in a liquid alkaline medium in the presence of an oxygen source at a temperature below about 200° C. for a sufficient time for reaction to occur.

The aqueous solution source of reactant (bismuth and M) cations is meant by definition to include any aqueous solution which will dissolve ionic bismuth and M cations. This metal cation containing solution may be prepared using bismuth source materials which include bismuth nitrate, bismuth chloride, bismuth oxide, bismuth oxalate and bismuth oxychloride. Among the mentioned bismuth source materials, preferred is bismuth nitrate. The M source materials used in preparing the aqueous solution source of bismuth and M cations include ruthenium chloride, ruthenium nitrate, ruthenium nitrosyl nitrate, iridium chloride, iridium hydroxide and iridium oxalic acid, as well as mixtures thereof. Desirably, the M source material is either a ruthenium source or an iridium source, although mixtures thereof may be employed. The preferred M source materials include ruthenium nitrate and iridium chloride.

The aqueous solution source of bismuth and M cations is prepared by dissolving appropriate amounts of bismuth source material and M source material in aqueous solvent. Usually the bismuth and M source materials are dissolved in aqueous acid solutions, the acid solutions being just strong enough to cause the bismuth and M source materials to dissolve. Acids such as nitric or hydrochloric may be used but nitric acid is preferred.

The bismuth source material and M source material are dissolved in relative amounts so as to achieve, in general, an initial reactant bismuth to M ion ratio of at least about 1.0:1.0. Desirably, this ratio is within the range of about 1.05:1.0 to about 10.0:1.0. In the preferred embodiments, the bismuth to M ion ratio is in the range of about 1.2:1.0 to about 5.0:1.0. As a practical matter, the reactants may be used in a bismuth to M ion ratio appreciably higher than the ratio of bismuth to M in the final pyrochlore product.

Preparation of the aqueous solution source of bismuth and M cations in the manner just described assures atomic scale mixing of the cations and thereby provides favorable kinetics for the low temperature, solution medium synthesis that follows.

The liquid alkaline medium is meant by definition to include any liquid alkaline medium which will promote reaction between the bismuth ions and M ions from the mentioned aqueous solution source of bismuth and M cations, and will effect the precipitation of the desired pyrochlore phase. The liquid alkaline medium may be any which satisfies this definition and includes alkali metal hydroxides, and especially their aqueous basic solutions. Thus, the liquid alkaline medium may desirably be an aqueous basic solution containing a base selected from the group consisting of sodium hydroxide, rubidium hydroxide, cesium hydroxide, potassium hydroxide and mixtures thereof. Sufficient base is included so as to render a liquid alkaline medium having a pH of at least about 13.5. Preferably, sufficient base is employed so as to produce a liquid alkaline medium having a pH of between about 14 and 15.5. Exact amounts of base material need not be specified since pH determination is within the purview of the artisan.

It is also found to be helpful, although not necessary, to saturate the alkaline reaction medium with respect to one or more of the reactant cations (and especially with respect to the most alkali soluble cation reactant) prior to combination of the aqueous solution source of A and B cations with the alkaline reaction medium. This may be done so as to avoid large discrepancies between cation ratios in the reacted product and in the initial reactant mixture due to possible solubility in the alkaline reaction medium of one or more of the reactant cations.

The alkaline medium acts solely as a reaction medium and not as a constituent in the reaction. This is supported by the fact that the pyrochlores made by the method of this invention show less than 0.02% (by weight) alkali metal cation as measured by atomic absorption.

The oxygen source is meant to include by definition any source which will provide the oxygen needed to form the pyrochlore compound. The oxygen source may be any of the bismuth source material, the M source material, the alkaline liquid medium or combinations thereof. Alternatively or additionally, the oxygen source may be or include independent oxygen-contributing material, e.g. bubbled oxygen or oxygen-containing salts or other additives. In any event, an essential aspect of the present invention compound preparation is the inclusion of adequate oxygen to permit the formation of the pyrochlore structure.

No criticality exists as to whether the aqueous solution source of bismuth and M cations is added to the alkaline medium or whether the alkaline medium is added to the aqueous source of reactant cations. However, the former is usually practiced to insure that all of the cations see an excess of alkaline medium. In general, at least about 1.0 liter of liquid alkaline medium is used per sum total mole of metal cation reactant. As mentioned, the reaction may be carried out at temperatures below about 200° C. Desirably, the reaction temperature is within the range of about 10° to about 100° C. Preferably, the reaction is carried out at temperatures within the range of about 50° to about 80° C.

During the reaction period, the alkaline medium may be replaced with fresh alkaline medium although this is not necessary for successful practice of the invention. The reaction is carried out for a time sufficient for reaction to occur. With many reactant combinations, at least a partial reaction occurs almost instantly. In any event, the length of time over which the reaction should be allowed to proceed is a matter of choice. Within limits, however, the longer the reaction time, the greater the extent of reaction. As a practical matter, a significant amount of reaction product is obtained by reacting for about 1 day, and generally a reaction time of about 3 to about 7 days is advantageous.

After the reaction is completed, the reaction product may be separated by known separation means. These separation techniques include filtration and centrifugation. Various post treatments may be employed as desired. These might include heat treatments to improve the crystallinity of the product and/or washing in various media in order to leach out any unreacted metal species. The reaction product includes one or more of the pyrochlore compounds of formula (1) above. When preferred amounts of reactants are employed, compounds of formula (1) may be obtained wherein $0 < x \leq 1.0$.

As mentioned, the above pyrochlores of the present invention have an expanded lattice and exhibit a high surface area. Further, these compounds display high electronic conductivity, thus making them particularly useful for electrode applications, e.g. as oxygen electrodes. Thus, the present invention is also directed to an electrochemical device, as mentioned.

The electrochemical device of the present invention contains one or more of the mentioned novel bismuth-rich pyrochlore compounds as an electrocatalyst material. More specifically, the device is one which contains an oxygen electrode containing one or more of the mentioned compounds as the electrocatalyst material. The device, therefore, may be any electrochemical device having this oxygen electrode, including metal oxygen batteries, metal-air batteries, other types of batteries containing one or more oxygen electrodes, fuel cells, electrowinning devices and electrolyzers. These include both the oxygen-reducing electrode devices as well as the oxygen-producing electrode devices. For example, these devices include those which contain oxygen-reducing cathodes which consume or electrocatalytically reduce oxygen in an oxygen-containing gas. Also included are the oxygen-producing anode devices wherein oxygen is liberated or produced by electrocatalytic oxidation of oxygen-bearing compounds. The devices of the present invention contain the mentioned oxygen electrode or electrodes and otherwise may be the same as conventional devices which are well known to the artisan. Thus, the present invention contemplates all known electrochemical devices having oxygen electrodes except that one or more of the above compounds is used as the electrocatalyst material of the oxygen electrodes.

BRIEF DESCRIPTION OF THE DRAWINGS

FIG. 1 illustrates oxygen electroreduction performance curves for the novel compound of the present invention having the formula $Bi_2[Ru_{2-x}Bi_x]O_{7-y}$ as employed in an electrochemical device of the present invention, and for 10% platinum on carbon as tested in a similar device; and, FIG. 2 is a oxygen evolution curve for $Bi_2[Ru_{2-x}Bi_x]O_{7-y}$.

DETAILED DESCRIPTION OF THE DRAWING AND THE EXAMPLES

The present invention will be more fully appreciated in view of the following examples. However, these examples are presented for illustrative purposes, and the present invention should not be construed to be limited thereto:

EXAMPLE 1

A bismuth-rich pyrochlore, e.g. $Bi_2[Ru_{2-x}Bi_x]O_{7-y}$, of the present invention is prepared as follows:

$Bi(NO_3)_3.5H_2O$ and $Ru(NO_3)_3$ are combined in aqueous solution in an approximately 1.0:1.0 molar ratio of bismuth to ruthenium. That is, about 2.425 grams of $Bi(NO_3).5H_2O$ and about 1.435 grams of $Ru(NO_3)_3$ (in aqueous solution) are added to 100 ml of water and 50 ml of concentrated nitric acid to obtain an equimolar bismuth-ruthenium aqueous solution. This solution is then added, with stirring, to 600 ml of 9 N KOH which is heated to approximately 75° C. Precipitation of a solid occurs immediately. The reaction is carried out, with stirring, for approximately 16 hours in this medium. The solid is then separated by vacuum filtration and reacted for another 16 hours in 600 ml of approximately 6 N KOH at 75° C. The solid is then again separated by vacuum filtration and reacted for an additional 65 hours in 600 ml of 3 N KOH at 85° C. The reacted product after separation by filtration is washed with distilled water and dried. X-ray diffraction shows that the reacted product is a crystalline material exhibiting the pyrochlore crystal structure. The indices and interplanar spacings for the X-ray diffraction reflections for this compound are given in Table I below. Comparison with the X-ray diffraction pattern of the previously known material $Bi_2Ru_2O_{7-y}$ (given in Table II) shows that the compound of the present example has a crystal lattice that is expanded relative to $Bi_2Ru_2O_{7-y}$ and, thus, is a significantly different and new material. The surface area, measured by the BET $N_2$ absorption method, is 178 m$^2$/g.

After a 2 hour firing at 400° C. of the reacted product X-ray diffraction shows that a second phase of $RuO_2$ has crystallized and is admixed with the pyrochlore phase. The pyrochlore phase remains unchanged by this heat treatment. The bismuth to ruthenium ratio, as determined experimentally by X-ray fluorescence, is 1.07±.05:1.0. Since the pyrochlore phase with the expanded lattice (relative to $Bi_2Ru_2O_{7-y}$) is admixed with an impurity phase of $RuO_2$, the bismuth to ruthenium ratio in the expanded pyrochlore must be significantly greater than 1.0:1.0 and is therefore properly referred to as a bismuth-rich pyrochlore, e.g. $Bi_2[Ru_{2-x}Bi_x]O_{7-y}$.

TABLE I

X-RAY DIFFRACTION POWDER FOR $Bi_2[Ru_{2-x}Bi_x]O_{7-y}$

| h k l | d(A) |
|---|---|
| (222) | 3.02 |
| (400) | 2.59 |
| (440) | 1.83 |
| (331) | 2.38 |
| (622) | 1.56 |
| (800) | 1.30 |
| (662) | 1.19 |

TABLE II

X-RAY DIFFRACTION POWDER PATTERN FOR $Bi_2Ru_2O_{7-y}$

| h k l | d(A) |
|---|---|
| (111) | 5.946 |
| (311) | 3.105 |
| (222) | 2.973 |
| (400) | 2.575 |
| (331) | 2.363 |
| (333) (511) | 1.982 |
| (440) | 1.821 |
| (531) | 1.741 |
| (622) | 1.553 |
| (444) | 1.487 |
| (553) (731) | 1.341 |
| (800) | 1.287 |
| (733) | 1.258 |
| (662) | 1.181 |
| (840) | 1.152 |

EXAMPLE 2

To illustrate the utility of the compound which is obtained by the method of Example 1, electrocatalytic performance curves are obtained in 3 N KOH at 75° C. In these tests, the material is fabricated into test electrodes consisting of the catalyst, a binder, a wetproofing agent and a support. Teflon serves as both a binder and wetproofing agent for all the electrodes tested. Gold expanded metal screen is used as the support.

Electrodes are fabricated by mixing a weighed amount of catalyst with a few drops of water adding a measured volume of Teflon 42 suspension, and mixing vigorously to precipitate the Teflon. The gummy product is then spread on weighed gold Exmet screen and is pressed dry between filter paper. The electrode is then cold pressed for 0.5 min. at 200 psi, is allowed to air dry for 30 min. and is then hot pressed in an inert atmosphere at 325° C., 500 psi for 0.5 min. After cooling, the electrode is weighed to determine its loading and then placed in the electrochemical cell for testing.

The electrochemical half-cell used for testing is of the interface maintaining type and consists of a jacketed liquid phase cell compartment. The liquid side contains the platinum wire counter electrode, a saturated calomel reference electrode (in contact by Lugin capillary), and magnetic stirrer. The gas side contains (oxygen) inlet and outlet and a stopcock to drain off any condensate. The working electrode is held in place (between the two compartments) between two Teflon discs with a gold current collector pressing against it.

The cell is connected to a Princeton Applied Research Model 173 potentiostat with a programmer and logarithmic current converter. Constant rate potential sweep measurements are conducted. Outputs of potential and log of current are recorded on an x-y plotter, and the resulting potential vs. log current density plot, referred to as a performance curve, is used to evaluate the electrode activity.

FIG. 1 shows performance curves for the electrocatalytic reduction of oxygen in 3 N KOH at 75° C. using the bismuth-rich pyrochlore of Example 1 and using platinum supported (10% by weight) on active carbon. The platinum on carbon electrode is typical of conventionally used supported noble metal electrocatalysts. The results shown in the Voltage-Current Density plot of FIG. 1 establish that the bismuth-rich pyrochlore compound of Example 1 has oxygen electro-reduction capability superior to a conventional supported platinum electrocatalyst in the tested environment. Also included in FIG. 1 is the performance curve for pure $RuO_2$ which has heretofore been recognized as an oxygen electrocatalyst. A comparison of the curves in FIG. 1 will show that the favorable electrochemical activity which is obtained with the electrode fabricated from the material of Example 1 is not due to the presence of an impurity phase of $RuO_2$.

FIG. 2 shows a performance curve for the electrocatalytic evolution of oxygen from 3 N KOH at 75° C. using the electrode fabricated from the material of Example 1. Also included for comparison are oxygen evolution performance curves for $RuO_2$ and platinum black. It is evident that the oxygen over-potential (anodic polarization) at any current density is much greater for platinum or $RuO_2$ than it is for the bismuth-rich pyrochlore, demonstrating that the used bismuth-rich pyrochlore compound of the present invention remains a superior electrocatalyst.

EXAMPLE 3

A bismuth-rich pyrochlore, e.g. $Bi_2[Ru_{2-x}Bi_x]O_{7-y}$, of the present invention is prepared as follows:

$Bi(NO_3)\cdot 5H_2O$ and $Ru(NO_3)_3$ are combined in aqueous solution in an approximately 1.5:1.0 molar ratio of bismuth to ruthenium. That is, about 3.60 grams of $Bi(NO_3)_3\cdot 5H_2O$ and about 2.12 grams of $Ru(NO_3)_3$ (in aqueous solution) are added to 75 ml of distilled water and 15 ml of concentrated nitric acid to obtain a bismuth-ruthenium aqueous solution. This solution is then added, with stirring, to 150 ml of 12 N KOH at room temperature. Precipitation of a solid occurs immediately. The solution is heated to 90° C. and the reaction is carried out, with stirring and with oxygen being bubbled through the solution, for approximately 20 hours. The solid is then separated by vacuum filtration, washed in distilled water, and dried at 100° C. The measured lattice parameter of this material is approximately 10.465 A and demonstrates that the lattice is clearly expanded relative to $Bi_2Ru_2O_{7-y}$ which has a lattice parameter of 10.299 A. The surface area, measured by the BET $N_2$ absorption method, is 136 m²/g.

After a two-hour firing at 400° C. of the reacted product, X-ray diffraction shows that no second phases have crystallized. Thus, the pyrochlore is not admixed with any impurity phase. The pyrochlore phase remains unchanged by this heated treatment. The bismuth to ruthenium ratio, as determined experimentally by X-ray fluorescence, is 1.78:1.0. The formula for this pyrochlore may therefore be expressed as $Pb_2[Ru_{1.44}Bi_{0.56}]O_{7-y}$. The fact that the bismuth to ruthenium ratio in the reacted product pyrochlore is higher than in the initial reactant mixture can be explained by the solubility of ruthenium in the strongly alkaline reaction medium. This is confirmed by the presence of ruthenium in solution in the filtrate that is obtained when the pyrochlore product is separated from the reaction medium.

What is claimed is:

1. A compound having the formula:

$$Bi_2[M_{2-x}Bi_x]O_{7-y}$$

wherein M is selected from the group consisting of Ru, Ir and mixtures thereof, wherein x is greater than or equal to about 0.1 and less than or equal to about 1.0 and wherein y is greater than or equal to zero and less than or equal to about 1.0.

2. The compound of claim 1 wherein M is Ru.
3. The compound of claim 1 wherein M is Ir.
4. The compound of claim 1 wherein x is within the range of about 0.1 to about 0.8.
5. The compound of claim 4 wherein M is Ru.
6. The compound of claim 4 wherein M is Ir.
7. The compound of claim 1 wherein x is within the range of about 0.25 to about 0.6.
8. The compound of claim 7 wherein M is Ru.
9. The compound of claim 7 wherein M is Ir.
10. In an electrochemical device having an oxygen electrode containing an electrocatalyst material, the improvement comprising using as said electrocatalyst material one or more compounds selected from the group consisting of those compounds having the following formula:

$$Bi_2[M_{2-x}Bi_x]O_{7-y}$$

wherein M is selected from the group consisting of Ru, Ir and mixtures thereof, wherein x is greater than or equal to about 0.1 and less than or equal to about 1.0, and wherein y is greater than or equal to zero and less than or equal to about 1.0.

11. The electrochemical device of claim 10 wherein said device is a fuel cell.
12. The electrochemical device of claim 10 wherein said device is a metal-air battery.
13. The electrochemical device of claim 10 wherein said device is an electrolyzer.
14. The electrochemical device of claim 10 wherein said device is a metal electrowinning device.
15. The electrochemical device of claim 10 wherein M is ruthenium.
16. The electrochemical device of claim 15 wherein said device is a fuel cell.
17. The electrochemical device of claim 15 wherein said device is a metal-air battery.
18. The electrochemical device of claim 15 wherein said device is an electrolyzer.
19. The electrochemical device of claim 15, wherein said device is a metal electrowinning device.
20. The electrochemical device of claim 10 wherein M is iridium.
21. The electrochemical device of claim 20 wherein said device is a fuel cell.
22. The electrochemical device of claim 20 wherein said device is a metal-air battery.
23. The electrochemical device of claim 20 wherein said device is an electrolyzer.
24. The electrochemical device of claim 20 wherein said device is a metal electrowinning device.
25. The electrochemical device of claim 10 wherein x is within the range of about 0.1 to about 0.8.
26. The electrochemical device of claim 25 wherein said device is a fuel cell.
27. The electrochemical device of claim 25 wherein said device is a metal-air battery.
28. The electrochemical device of claim 25 wherein said device is an electrolyzer.
29. The electrochemical device of claim 25 wherein said device is a metal electrowinning device.
30. The electrochemical device of claim 10 wherein x is within the range of about 0.25 to about 0.6.
31. The electrochemical device of claim 30 wherein said device is a fuel cell.
32. The electrochemical device of claim 30 wherein said device is a metal-air battery.
33. The electrochemical device of claim 30 wherein said device is an electrolyzer.
34. The electrochemical device of claim 30 wherein said device is a metal electrowinning device.

* * * * *